INVENTOR.
ROBERT G. FRIEDMAN
BY
RICHEY, WATTS, EDGERTON & McNENNY
Donald W. Farrington
ATTORNEYS

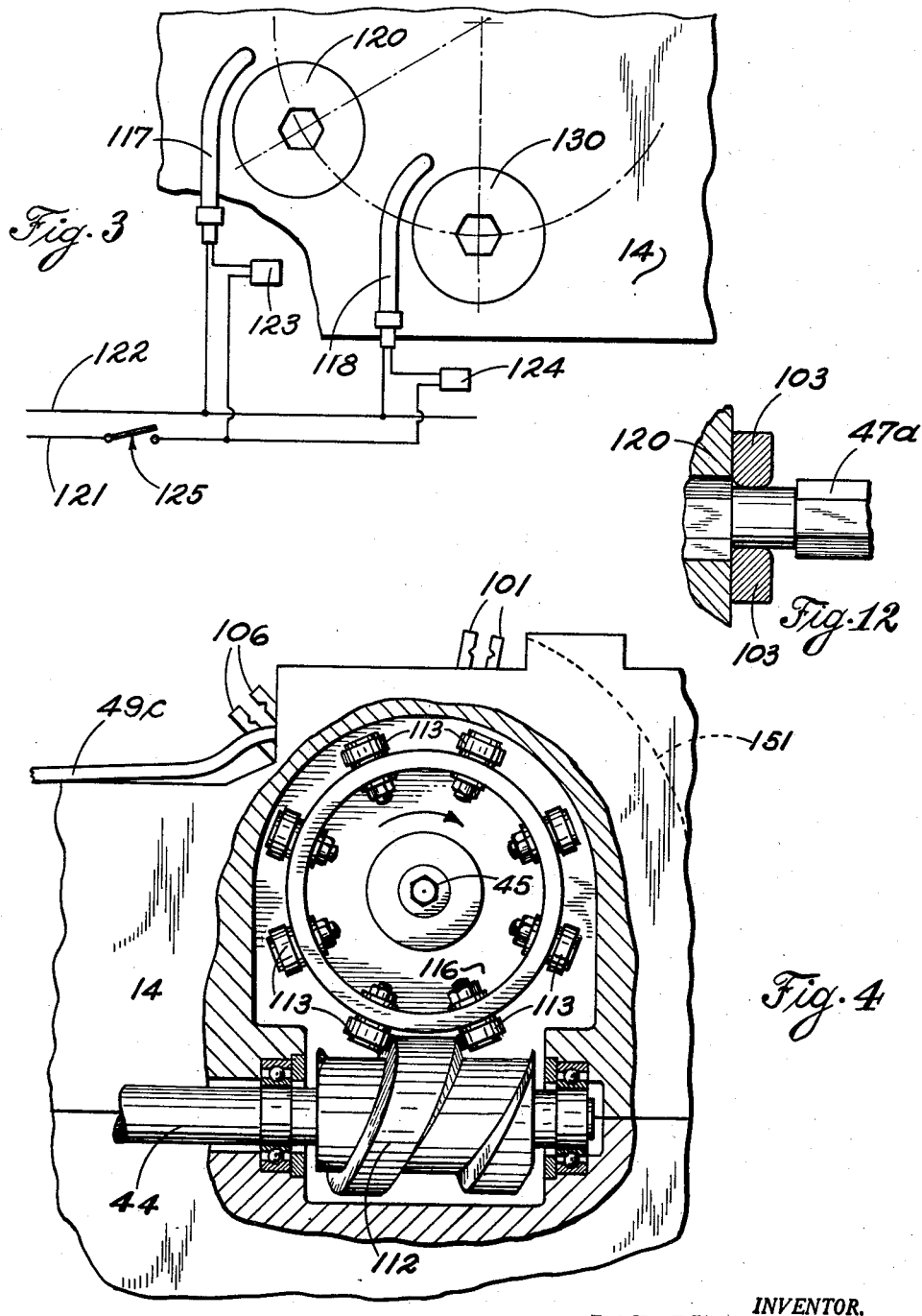

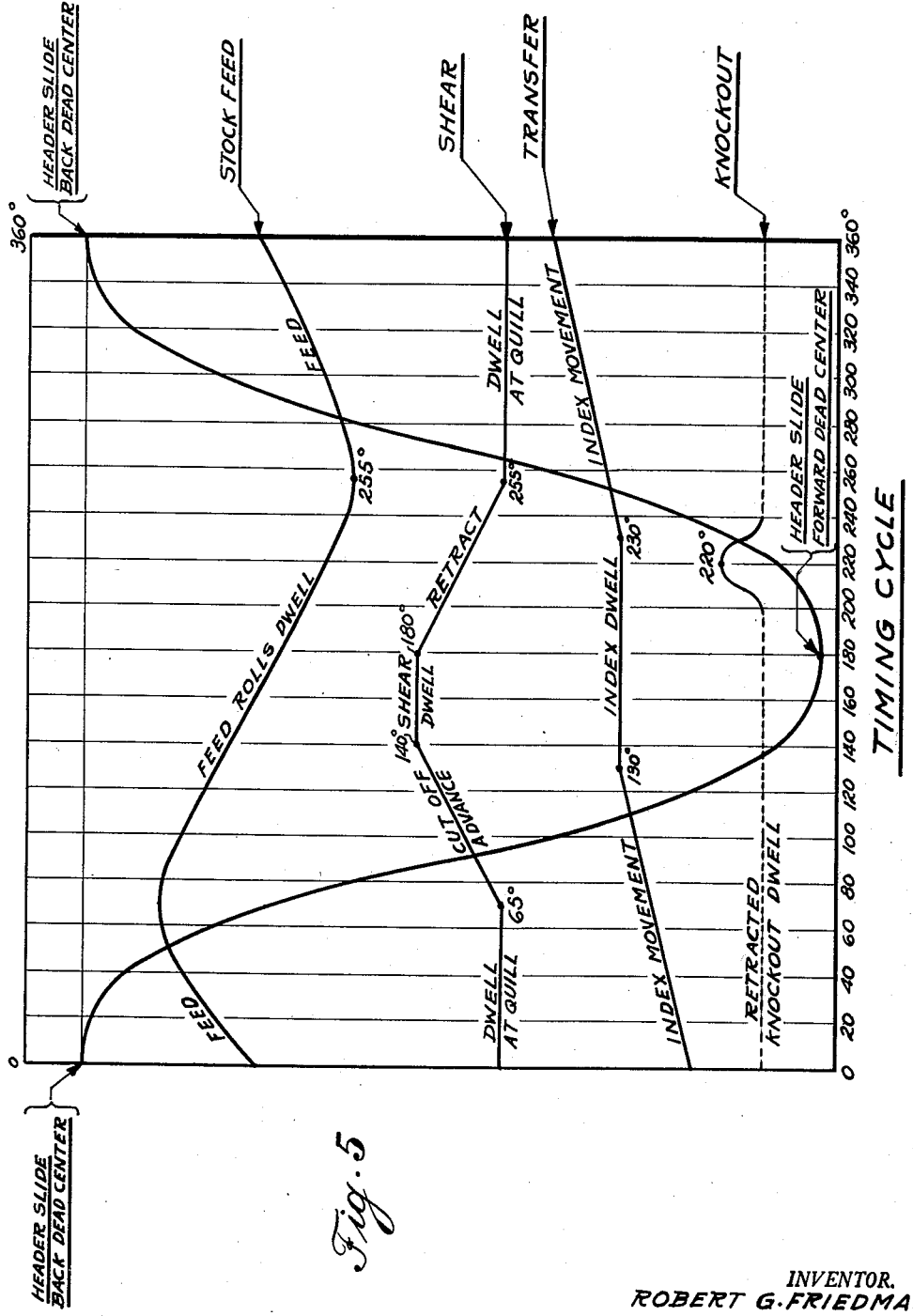

Feb. 23, 1960 R. G. FRIEDMAN 2,925,610
HOT FORGING MACHINE HAVING STOCK DESCALING MEANS
OPERATIVELY DRIVEN BY STOCK SHEAR MEANS
Filed Aug. 22, 1955 5 Sheets-Sheet 5

INVENTOR.
ROBERT G. FRIEDMAN
BY
RICHEY, WATTS, EDGERTON & McNENNY
Donald W. Farrington
ATTORNEYS

United States Patent Office 2,925,610
Patented Feb. 23, 1960

2,925,610

HOT FORGING MACHINE HAVING STOCK DESCALING MEANS OPERATIVELY DRIVEN BY STOCK SHEAR MEANS

Robert G. Friedman, Tiffin, Ohio, assignor to The National Machinery Company, Tiffin, Ohio, a corporation of Ohio Application August 22, 1955, Serial No. 529,869

7 Claims. (Cl. 10—76)

This invention relates to method and apparatus for metal working and more particularly to a method and apparatus wherein hot rod stock is progressively advanced through means to descale the stock, cut off a blank of descaled stock and thereafter shape the cut blank while hot to form metallic articles such as nuts, washers, sleeve collars, and the like.

In the art of making articles from hot rod stock, there has long been a need for the elimination of the scale from the stock prior to its working in the dies and tools. The hard oxide and other scale formed on the surface of the hot stock adversely affects the dies and tools in which the blank is to be worked. According to certain prior art proposals the hot rod stock is cut to provide a blank of the length required for the finished article and the blank is then subjected to pressure across the cut end faces of the blank to upset the blank and cause scale to be broken loose from the surface of the sides of the blank. The upset blank is thereafter rolled or dropped in an effort to free the blank of loose scale and then pierced and punched out in adjacent piercing and punching dies.

Among the disadvantages of the prior art methods and apparatus is that the hot blank was held in contact with the relatively cold dies and tools for a relatively long period of time resulting in excessive heat loss in the blank which in turn required the use of higher pressures on the tools and dies during the working of the blank.

Another disadvantage associated with the prior art devices is that the hot stock was cut off to form a blank prior to the removal of the scale from the stock so that the scale on the hot rod stock presented to the shear adversely affected the useful life of the shear or cut-off device. Another disadvantage results from the loss of positive control of the blank by dropping and/or rolling the blank.

According to the present invention the stock is heated and descaled prior to shearing of the blank and the cut blanks are held during transfer and worked in successive dies so that the loss of heat from the cut blank is minimized and lower blank working pressures on the tools and dies may be obtained.

It is among the objects of the present invention to provide a method of making articles from hot metal rod stock wherein a length of stock is sequentially heated, descaled, cut off, upset, pierced and punched without substantial transfer of heat from the blank to the tools during the working of the metal.

It is a further object of the present invention to provide an apparatus for pulling a length of stock through a heating device and through a descaling apparatus and at the same time feed a descaled portion of the stock into a shear whereby the hot stock is descaled prior to entering the means for shearing and working of the stock.

It is a further object of the present invention to provide an apparatus for making metal articles wherein hot rod stock is progressively advanced into a shear which cuts off a length of stock and moves the cut length transversely into alignment with fingers carried by a rotating transfer device and wherein said blank is carried through a circular path in intermittent steps and wherein the blank is successively worked in dies along said circular path.

It is a further object of the present invention to provide a transfer mechanism for an apparatus according to the preceding objects wherein a hot blank is carried in a circular path by transfer fingers to an upsetting die and the blank is moved out of the transfer fingers into the upsetting die by one of the tools which accomplishes the upsetting and wherein the same blank subsequent to upsetting is moved back into the same transfer fingers by the other of the upsetting tools.

It is a further object of the invention to provide an apparatus for making articles having a plurality of bed frame dies arranged in a circular path and wherein a rotating transfer is concentrically arranged with respect to the bed frame dies to carry blanks successively about a circular path from one bed frame die to the next adjacent bed frame die for successive working by header slide tools.

It is a further object of the invention to provide an apparatus according to the preceding object wherein the transfer mechanism is characterized by a number of pairs of co-operating transfer fingers and wherein the number of pairs of transfer fingers is not exceeded by the number of stations where the blanks are to be handled.

It is a further object of the invention to provide an apparatus for making articles of hot metal blanks with heating means for portions of the apparatus in contact with the hot blank whereby the heat loss during working is minimized.

Further objects and advantages relating to efficiency and economy of operation and to long tool life and simplicity in construction, will appear from the following description and the appended drawings, wherein Fig. 1 is a plan view with parts in section showing a machine embodying the present invention;

Fig. 3 is a diagrammatic showing of the die heating apparatus constructed and arranged according to the present invention;

Fig. 4 is an elevation showing the drive mechanism for the indexing transfer taken along the plane indicated at 4—4 of Fig. 1;

Fig. 5 is a diagram showing the timed relation of the movements of the principal components of a machine embodying the invention;

Fig. 12 is a view with parts in section showing a blank about to be pushed out of the transfer fingers into a die.

Figure 1:
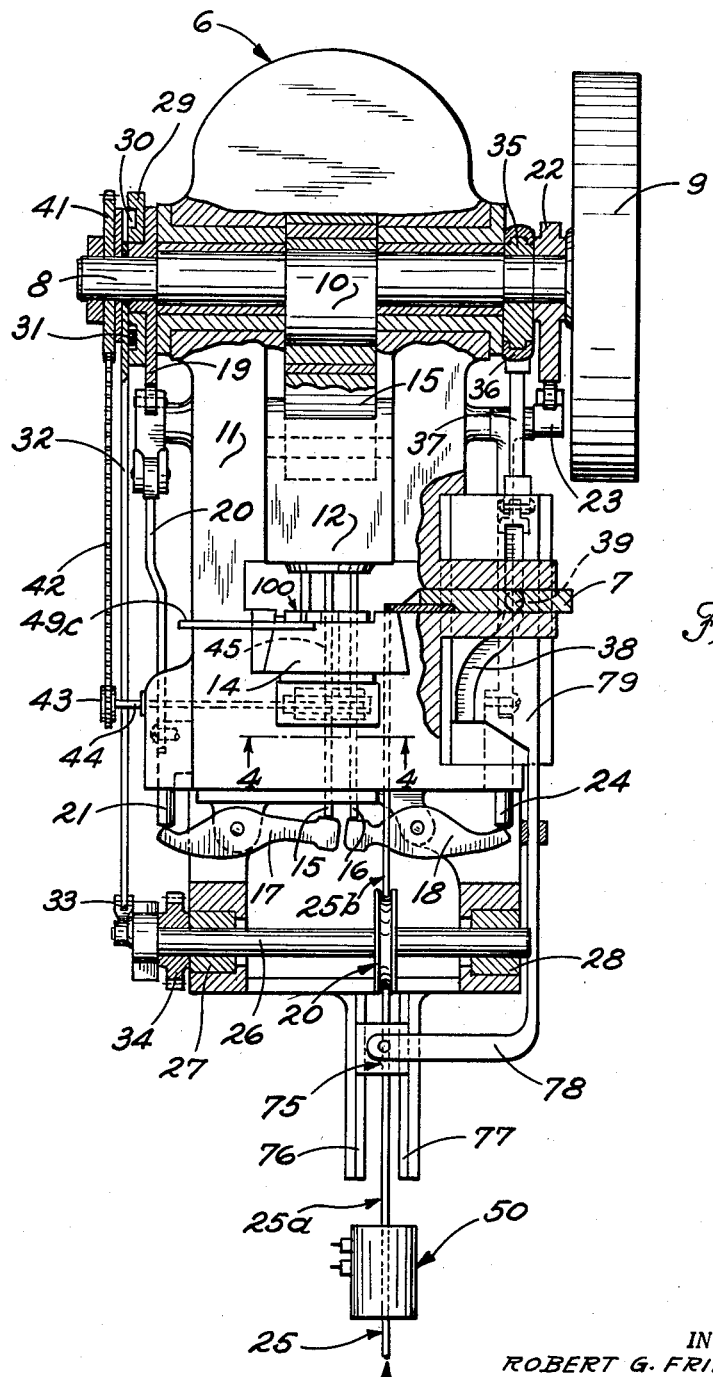

The apparatus of the present invention comprises a machine indicated in its entirety as at 6 for working the hot blank, a heater for the incoming stock indicated at 50, and a descaling device indicated at 75. Intermittently operated feed rolls 20 pull the stock through the heater 50, through the descaler 75 and at the same time advance a length of stock into a shear 7 mounted for movement transversely of the stock. Within the machine 6 a crank shaft 8 provided with fly wheel 9 and crank eccentric 10 is employed to operate the various moving components of the machine. The crank shaft is mounted in suitable bearings within the bed frame 11 and a reciprocating header slide 12 is driven by the connecting rod or pitman 15 on the eccentric 10. The header slide 12 carries a plurality of tools arranged in a circular path to cooperate with dies and transfer mechanism carried on the die breast 14. Two of the dies within the die breast are provided with knock-outs 15 and 16 respectively, which knock-outs are actuated in timed relation to the movement of the header slide by knock-out levers 17 and 18 respectively. The crank shaft 8 is provided with a knock-out cam 19 to the left-hand side of the machine which through cam followers and levers indicated at 20 reciprocates a knock-out pin 21 in engagement with the knock-out lever 17. The crank shaft at the right-hand side of the machine is provided with a knock-out cam 22 which through cam followers and levers indicated at 23 reciprocates the knock-out actuating pin 24 which bears against the end of the knock-out lever 18.

The descaled hot rod stock indicated at 25b is advanced by feed rolls and the upper feed roll 20 fixed to feed roll shaft 26 is mounted in widely spaced bearings 27 and 28 to intermittently advance the stock. The spacing of the bearings 27—28 from the feed rolls makes it possible to run the rolls hot without affecting the lubrication of the feed roll shaft. Heating means not shown may be arranged adjacent the feed rolls to minimize heat transfer from the rod stock to the feed rolls. A feed roll cam plate 29 is fixed to the crank shaft at the left-hand side of the machine which is provided with a groove 30 to receive a roller 31 on a link 32 connected to a crank 33 below the feed roll shaft 26. As will be understood, a pair of feed rolls such as 20 are arranged one above the other and the lowermost feed roll is provided with a shaft driven by a gear 34 fixed to shaft 26 so that the two feed rolls turn in unison in opposite directions to advance the stock 25b between the feed rolls.

The cold stock entering the heater 50 is indicated at 25 and during its passage through the heater is raised to a temperature of about 2250 degrees F. Although the heater 50 illustrated is an electric induction type of heater it will be understood that gas or oil-burning heaters may be employed to heat the stock at this location. The heated stock indicated at 25a is characterized by having the surface covered with scale and oxide, some of which scale was on the stock 25 before it was heated and other scale formed during the travel of the stock through the heating element 50. Some of such scale is loose and powdery and tends to fall by gravity from the stock as it is being advanced into the descaling unit 75. Other scale is in the form of granules or leaves tightly adhering to the stock.

Figure 10:
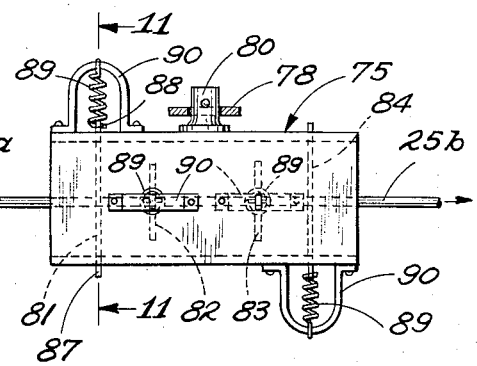
Fig. 10 is an elevation of the descaling apparatus.
Figure 11:
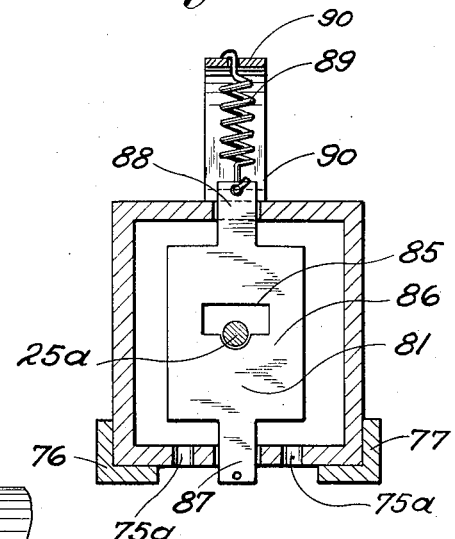
Fig. 11 is a sectional view of the descaling apparatus taken on the plane indicated at 11—11 of Fig. 10.

To remove the scale from the stock prior to its contact with the feed rolls 20 and the shear 7 the apparatus illustrated in Figs. 10 and 11 is provided. The descaling box indicated in its entirety as at 75 is mounted for reciprocation longitudinally of the stock on spaced guideways 76 and 77 and the reciprocation along the guideways is accomplished by a reciprocating arm 78 carried by the shear slide 79. The arm 78 is apertured to receive a pivot pin 80 carried by the descaling box 75. A series of four descaling plates 81, 82, 83, and 84 are mounted within the descaling box. Each of the descaling plates is formed with a central aperture 85 having a semi-circular notch 86 embracing about 180 degrees of the rod stock entering the descaler. One end of each descaling plate is provided with a tongue 87 loosely projecting through an opening in the wall of the box 75. A similarly shaped tongue 88 projects loosely through an opening at the opposite side of the box and the last-named tongue is hooked onto a tension spring 89 carried by a spring support 90 fixed to the exterior of the descaling box. This arrangement provides that the tension springs 89 pull the arcuate notch 86 against the surface of the rod being descaled while the box 75 is being reciprocated.

The loose mounting of the descaling plates permits a limited tilting of each plate due to the drag of the rod stock against the arcuate notch of the plate. Since the box is being reciprocated the tilt of the plates is reversed upon each reciprocation or change of direction of movement of the box so that alternate scraping edges are in engagement with the rod stock being descaled. The scraping edges are preferably formed of hard heat resistant material such as Stellite. The wall of the box 75 is preferably of insulated construction so as to confine the heat from the hot rod stock within the descaling box. The spring 89 for the descaling plates is mounted on the outside of the insulated box and thus the adverse effects of the heat with respect to the spring temper is minimized. The lower wall of the box is preferably provided with a series of apertures 75a so that scale removed from the rod stock by the plates 81—84 may fall by gravity out of the descaling box downwardly between the supporting rails 76 and 77.

The blanks are cut from hot rod stock entering the machine by a shear 7 which reciprocates transversely of the bed frame so as to shear off a blank and transfer the blank into a position where it may be engaged by one of the header slide tools. The crank shaft at the right-hand side of the machine as viewed in Fig. 1 is provided with an eccentric 35 surrounded by an eccentric strap 36 connected to the shear drive link 37. The shear slide 79 is connected to the drive link 37 so as to be reciprocated longitudinally in a guideway on the bed frame of the machine and a cam slot 38 in the slide 79 receives a depending roller 39 pivotally mounted on the shear 7. Thus during each cycle of the header slide movement the shear slide 7 is reciprocated in timed relation and the arm 78 carried by the shear slide moves the descaler box 75 along the hot rod stock adjacent the feed rolls.

An indexing type of transfer indicated in its entirety as at 100 is also driven by the crank shaft. A sprocket 41 is fixed at the left-hand end of the crank shaft 8 which drives a chain 42 and sprocket 43 which rotates a transversely arranged shaft 44 for driving the transfer gearing. The output shaft 45 of the index gearing terminates in the die breast where it rotates the transfer in timed relation to header slide movements. The transfer 100 may be rotated with an intermittent step-by-step motion sometimes referred to as a Geneva movement. Preferably the type of drive is that illustrated in Fig. 4 wherein the transfer shaft 44 is provided with a cam 112 arranged to engage rollers 113 pivotally mounted on the rim of the disk 116. The disk is keyed or otherwise is fixed to the output shaft 45 which extends longitudinally of the bed frame through the die breast 14 to rotate the transfer fingers 101—106. It will be understood that the cam 112 may be contoured to provide the dwell of the transfer fingers at the work stations as indicated in the timing diagram of Fig. 5.

Figure 6:
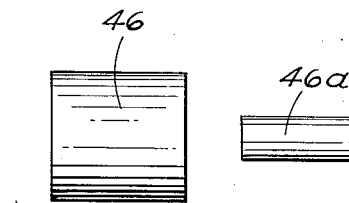
Fig. 6 is an elevation showing the cut blank and the header slide tool employed for pushing the cut blank out of the shear.
Figure 7:
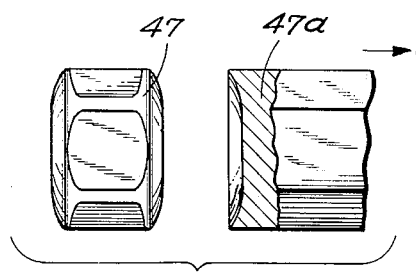
Fig. 7 is an elevation showing the blank after upsetting and the header slide tool employed for the upsetting operation.
Figure 8:
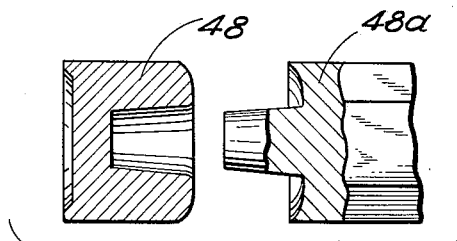
Fig. 8 is a sectional view of the blank after piercing and the header slide tool employed for the piercing operation.
Figure 9:
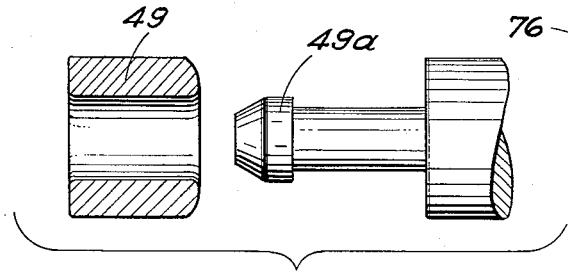
Fig. 9 is a sectional elevation of the blank after the web had been punched therefrom and the header slide punch employed for punching out a web of the blank.

The machine is constructed and arranged so that upon each revolution of the crank shaft a blank 46 (as shown in Fig. 6) is cut off by the shear 7 and moved horizontally into alignment with a pair of fingers 102 carried by the index transfer 100. The blank 46 is pushed out of the shear and into the transfer fingers 102 by a pusher 46a carried by the header slide. The blank 46 is thereafter moved by the transfer fingers into alignment with an upsetting die 120 in the die breast and there upset to the form indicated at 47 in Fig. 7 by a header slide tool 47a. The blank 47 after being upset is immediately pushed out of the upsetting die 120 in the die breast back into the waiting transfer fingers and again moved in a circular path to a piercing die 130 in the bed frame where it is pierced to the form indicated at 48 in Fig. 8 by a piercing tool 48a carried by the header slide. The blank shown at 48 is also immediately pushed out of the piercing die 130 in the die breast back into the waiting transfer fingers as the header tool 48a recedes and is then moved by the fingers to a punching die 140 in the die breast. The punched out blank is indicated at 49 in Fig. 9 and the punching tool 49a carried by the header slide punches the web or slug out of the blank. After punching the blank is stripped from the tool 49a and moved upwardly in a circular path to a discharge station where the blank is pushed out of the fingers by a header slide pusher 49b and the blank falls by gravity into a chute 49c discharging at the side of the machine.

Figure 2:
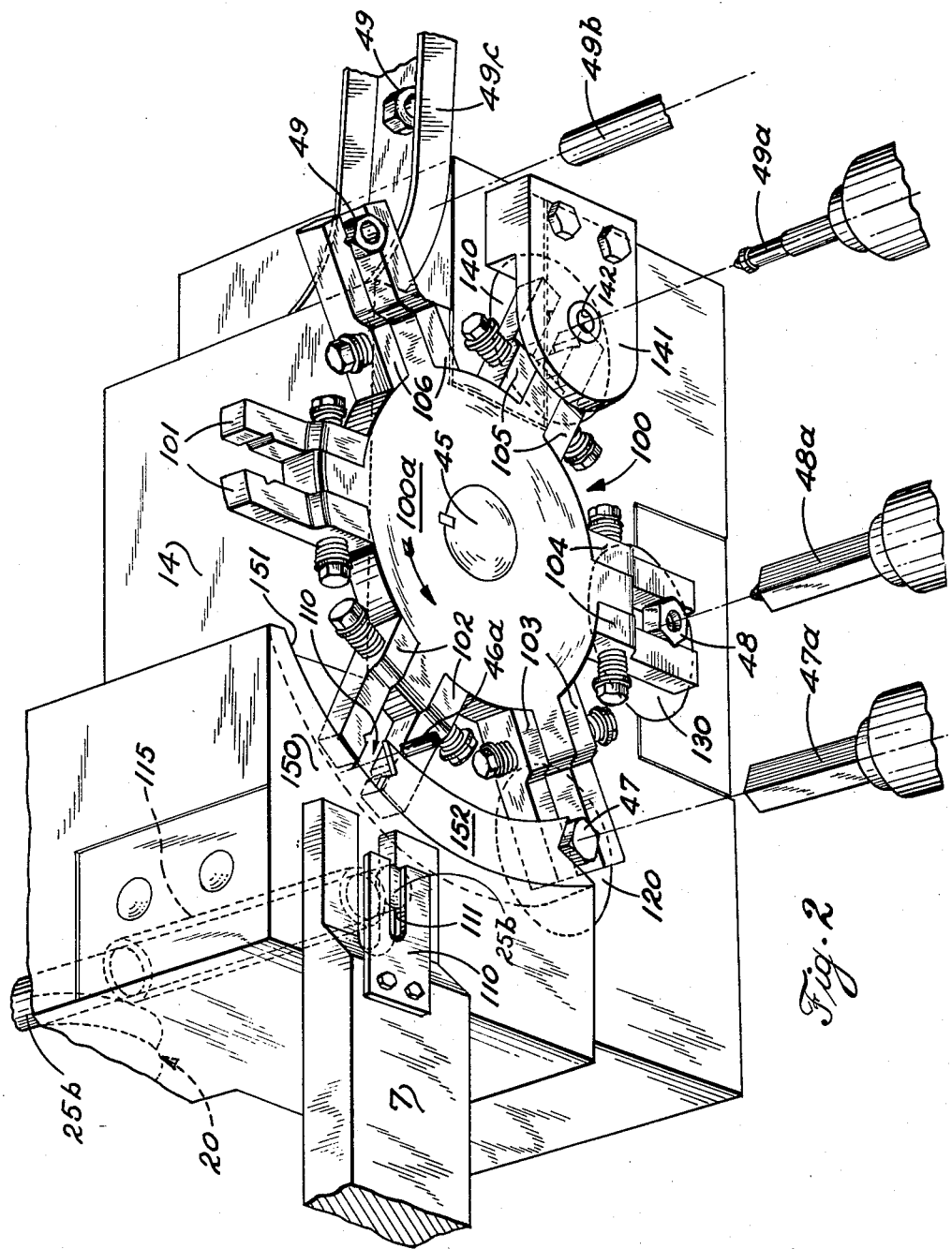
Fig. 2 is a perspective view looking in toward the bed frame dies showing the transfer apparatus of the present invention.

Referring particularly to Fig. 2 the indexing transfer indicated at 100 is provided with six pairs of co-operating transfer fingers angularly spaced from each other 60 degrees. There are five work stations arranged in a circular path to co-operate with the indexing transfer 100. The pair of fingers 101 disposed at the top position are at an idle or empty position within view of the operator. The indexing transfer is in the form of a disk 100a provided with six radially projecting lugs upon which the co-operating transfer fingers are mounted. The transfer fingers 102 are arranged at the first station 110 so that the blank receiving portion of the fingers is in the same horizontal plane as the blank in the shear 7. Thus the fingers 102 are disposed at an angle of about 30 degrees above the horizonotal plane of the transfer drive shaft 45 to present a horizontal opening for the blank. The next pair of fingers 103 is disposed 30 degrees below the horizontal plane of the drive shaft 45. An upsetting die 120 is mounted in the die breast in alignment with the transfer fingers 103 and the cut blank brought to this die station 120 is upset in the die to the form of the blank indicated at 47 in Fig. 7. The blank 47 is shown as a rough hex blank characterized by being upset in a die 120 having a hex cross section.

It will be understood that square nuts, circular articles or articles of irregular shape may be formed in appropriately shaped dies. Each pair of transfer fingers are mounted on the index disk 100a by means of coil springs urging one finger of a pair toward the other finger and the outer ends thereof are grooved to accommodate a hex blank across opposed points on the hex. From die station 120 the blank is carried by an indexing movement of the transfer to the next die station 130 where the upset blank is pierced within a hex die 130 for more than half of the axial extent of the blank. At the die station 130 the piercing tool 48a is advanced by the header slide so as to push the blank out of the fingers 104 and into the die 130. During the piercing it will be understood that the metal of the blank flows so as to increase its axial extent to form the blank 48 of Fig. 8 and during the piercing the exterior of the blank is fully conformed to the hex die with sharp corners throughout its height. Immediately following the piercing operation a knock-out in the die 120 moves in timed relation to the header slide to push the blank outwardly of the die 130 and back into the waiting fingers 104.

Thereafter the transfer 100 is again indexed 60 degrees to bring the pierced blank into position in alignment with a punching die 140 in the bed frame. The blank is held between fingers 105 and one end wall of the blank bears against the outer face of the die at the punching station. In moving the blank to the punching die 140 it is moved vertically into a space between the die breast and a stripper plate 141 mounted on the die breast. It will be understood that the round opening in the punching die 140 accommodates the punch 49a on the header slide and that the stripper plate is provided with a similar round aperture 142 so that after the slug or web is punched out of the blank, the blank will be retained behind the stripper plate as the punch 49a is withdrawn through the opening 142 in the stripper plate. Thereafter the transfer is indexed 60 degrees to a push-out station where the punched blank is being held by transfer fingers 106. A header slide pusher 49b engages the punched blank held in fingers 106 and upon full advance of the header slide pushes the blank out of the fingers 106 so that the blank falls by gravity into the chute 49c.

With the shear 7 in retracted position hot rod stock is advanced into the shear by the rolls 20 to engage a stock gauge 110 mounted on the shear. A slot 111 in the stock gauge terminates in alignment with the end face of the hot stock and the slot 111 has a width less than the maximum diameter of the stock. Thus when a cut blank is carried by the shear over into alignment with the fingers 102 the pusher 46a carried by the header slide may pass through the slot 111 and push the cut blank axially out of the shear into the fingers 102. In this connection it is pointed out that the shearing plane of the stock is nearer to the header slide than the plane of the die breast. The shearing operation takes place along the face of the section 150 which is nearer to the header slide than the die breast or vertical plane of the dies 120 and 130. The section 150 is formed as at 151 on an arc of a circle having the axis of the shaft 45 as its center so as to accommodate the circular path of the transfer fingers.

An overhanging plate 152 extends laterally from the surface 150 so as to overhang the portion of the transfer fingers moving in the arc between the receiving station 110 and the first die station 120. The plate 152 is notched at its upper end to provide an unobstructed horizontal path for the travel of the blank from the shear into the transfer fingers 102. The plate 152 is similarly notched at its lower end to provide access to the blank held within the fingers 103 for moving the blank back by means of the header slide tool 47a into the first upset die 120. During the movement of the cut blank from the receiving station 110 to die 120 the blank is between the transfer fingers and is restrained against axial movement by the die breast at one end and by the overhanging plate 152 at the other end. Thus the cut blank may be loosely held by the transfer fingers 102 during its travel to the die station 120. The minimum spacing of the ends of the fingers is less than the maximum diameter of the blank so that the alignment of the cut blank at die 120 is assured.

The transfer fingers are preferably chamfered at both faces as illustrated in Fig. 12. When the header slide tool such as 47a engages a blank less than the diameter of the tool the tool will cam the fingers 103 apart so as to follow the blank into the die such as 120. Although the knock-out timing is preferably such that the upset blank "follows" the header slide tool on retraction, the blank may be pushed into the waiting fingers by cam action of the blank on the chamfered edges of the fingers.

The hot stock being advanced to the shear is moved by the feed rolls 20 through a tube or bore in the bed frame as at 115. The tube 115 is slightly larger in diameter than the stock 25b being advanced to the shear so that the hot stock does not lose heat by direct contact with the relatively cold bed frame. Heat loss is also minimized by the timed relation between the index transfer and the header slide and the knock-outs for dies 120 and 130. As will be noted from the timing diagram of Fig. 5 the knock-outs 15 and 16 remain in their retracted position within the dies 120 and 130 until the header slide has started to move away from its maximum forward dead center position. The knock-outs are timed so as to push the blank out of the bed frame dies into the waiting fingers immediately following the header slide retraction.

This arrangement permits the blank to remain in the transfer fingers for the maximum portion of the operating cycle and be in contact with the bed frame dies only while the blank is actually being worked in the dies. The transfer fingers may be operated at relatively high temperatures and since there is no metal working pressure on the blank while it is in the transfer fingers the heat loss in the fingers is very low compared to the heat loss where the blank is being pressed into contact and worked in the dies 120 and 130.

As illustrated in the timing cycle of Fig. 5 the shear 7 is at a dwell position in front of the incoming stock as the feed rolls 20 advance the stock into the shear. At about 65 degrees from header slide back dead center position the shear moves horizontally to cut off the stock and position the blank in front of the fingers 102 at the starting station 110. At the end of the shear dwell, namely, at about 180 degrees from back dead center the pusher 46a on the header slide advances the cut blank into the first pair of transfer fingers 102. Thereafter the shear may be retracted and the slot 111 in the stock gauge accommodates the retracting movement of the shear while the pusher 46a is in its forward position. At about 250 degrees from the starting position with the header slide at back dead center the index transfer 100a carrying the fingers starts to move the fingers through an angle of 60 degrees. Since the dwell of the transfer is about 100 degrees the index plate 100a may move slowly during the 260 degrees of crank shaft motion available for transfer movement. This eliminates the need for sudden acceleration or deceleration of the transfer fingers which might tend to throw the blank out of the fingers by centrifugal force.

As will be observed from the preceding description of the machine, the component parts of the machine are constructed and arranged so as to minimize the transfer of heat from the hot blank to the relatively cooler parts of the machine which engage the hot stock. Preferably the two dies 120 and 130 in the bed frame are provided with means to raise the temperature of the dies as near as practicable to the temperature of the hot blank. It is in the dies 120 and 130 that the greatest area of the blank is in contact with the tools working the blank. The time within which the blank is being worked in the dies 120 and 120 is minimized by the construction and arrangement of the moving parts. Electric heating elements 117 and 118 are arranged within the die breast adjacent the dies 120 and 130 respectively. The electric lines 121 and 122 leading to the heaters include thermostats 123 and 124 so arranged that when the dies have reached a predetermined high temperature the circuit will be interrupted. Prior to starting the machine the switch 125 is closed for a period of time to bring the dies up to a temperature as near to the temperature of the hot blank as may be consistent with the material of which the dies are made. Ordinary high carbon steel dies may be heated to a temperature of about 400 to 600 degrees without adversely affecting the ability of the die to withstand the working pressures. Such elevated temperatures in the dies will substantially reduce the heat loss in the blank during the shaping of the article in the die.

In connection with the temperatures of the stock, it will be understood that the high temperature obtained in the heater 50 will vary somewhat depending upon the composition of the metal being worked. The rod stock referred to above as being heated to 2250 degrees F. is ordinary low carbon steel. By cutting off and sequentially working blanks at the rate of 40 to 60 blanks a minute in the apparatus here disclosed, scale formation on the cut end faces of the blank is prevented. Since the scale on the cylindrical side walls of the stock is removed by the descaler before the blank is cut and since the period of time between successive cuts is reduced to $1/40$–$1/60$ of a minute, scale free blanks are presented to the dies for working. It will be understood that rod stock having a higher carbon content will not be raised to the same temperature as low carbon steel. It will also be understood that the scale formation varies according to the composition of the metal employed and the time and temperature of the exposure to the oxidizing atmosphere.

During the operation of the machine here described and illustrated, rod stock is advanced from a stock reel through the heater 50, thence through the descaler 75, through the feed rolls 20 and into the shear 7. Although the stock is advanced by relatively short increments for making each blank the descaler is reciprocated by the full travel of the shear slide 79. This motion is substantially a continuous reciprocation over a length of stock exceeding that required for one blank. During each revolution of the crank shaft a blank is cut off by the shear and moved over into transfer position where the header slide tool 46a pushes the blank out of the shear and into the transfer fingers. Thereafter each cut blank is moved by indexing motion of the transfer to each of the work stations sequentially until a finished blank is discharged in the chute 49c.

Although I have shown and described one form of my invention in considerable detail, it will be understood that numerous modifications may be made in the various components of the machine without departing from the scope of the invention as defined in the following claims.

What is claimed is:

1. A machine for making metal articles from hot rod stock comprising a bed frame, a die breast in the bed frame having spaced dies arranged in a circular path, a crank shaft, a header slide driven by the crank shaft, tools on the header slide aligned with said dies, a shear, means connecting the shear and the crank shaft to drive the shear from the crank shaft, scale removing means mounted to engage the hot rod stock in advance of the engagement of the rod stock by the shear, means operatively connecting the shear drive means and the scale removing means to transmit movement of the shear drive means to the scale removing means, a transfer mechanism to transfer a blank from the shear and from one die along said circular path to the next adjacent die, said mechanism comprising a member mounted for rotation on an axis normal to the die breast, a plurality of pairs of spring pressed blank carrying fingers extending radially from said member, means to rotate said member in timed relation to said header slide to position a pair of fingers into alignment with one of said dies as one of said header slide tools advances into and retracts with respect to said dies.

2. A machine for making metal articles from hot rod stock comprising a bed frame, a crank shaft, a header slide driven by the crank shaft, hot feed rolls for advancing stock into the bed frame, shear drive means moved by the crank shaft, a shear moved by said shear drive means for cutting off a length of hot stock, said shear drive means including a member reciprocating longitudinally of the bed frame, reciprocating means for removing scale from the hot rod stock comprising blades embracing the stock adjacent the feed rolls, and means operatively connecting said scale removing means and said shear drive means for joint reciprocation whereby the stock is descaled prior to being cut off by the shear.

3. A machine for making metal articles from hot rod stock comprising a bed frame, means to heat the stock, a crank shaft, a header slide driven by the crank shaft, hot feed rolls for advancing stock into the machine, a shear driven by the crank shaft for cutting off a length of hot stock, said shear including a member reciprocating longitudinally of the bed frame, reciprocating means for removing scale from the hot rod stock comprising blades embracing the stock adjacent the feed rolls, said shear being operatively connected to said scale removing means for joint actuation, dies in the bed frame, tools on the header slide aligned with said dies, and means to heat the dies whereby heat transfer from the hot blank to the machine is retarded.

4. A machine for making metal articles from hot rod stock comprising a bed frame, a crank shaft, a header slide driven by the crank shaft, a shear driven by the crank shaft, feed rolls driven by the crank shaft for feeding a length of stock into the shear, heating means for the stock in advance of the feed rolls and reciprocating descaling means engaging the stock between the heating means and the feed rolls, said shear and descaling means being connected to each other for joint actuation out of phase with the header slide spaced dies in said bed frame, co-operating tools aligned with said dies mounted on the header slide, and means to heat said dies.

5. A machine for making metal articles from hot rod stock comprising a bed frame, a crank shaft, a header slide driven by the crank shaft, hot feed rolls driven by the crank shaft for advancing a length of stock into the machine, heating means for the stock in advance of the feed rolls and descaling means engaging the stock between the heating means and the feed rolls, a shear to cut off a length of stock, shear drive means including a reciprocating member driven by said crank shaft, means connecting said descaling means and said reciprocating member for joint actuation spaced dies in said bed frame, co-operating tools aligned with said dies mounted on the header slide, and means for heating the dies and means for limiting the temperature of the dies to prevent heat loss from the hot rod stock to the dies.

6. In a machine for producing forged metallic articles from hot elongated rod stock, including a main drive shaft, feed means intermittently driven by said shaft for advancing a predetermined increment of length of the hot rod stock axially into the machine once during each cycle of operation of the machine, shear means driven by said shaft for shearing off during each cycle of operation of the machine the increment of length of the rod stock advanced into the machine by said feed means, a die supported in said machine, means for delivering each sheared-off length of hot stock into said die and a header slide driven by said shaft having punch means for forging a sheared-off blank in said die once during each cycle of operation of the machine, a descaling means for the hot rod stock comprising a scraper engaging such stock and means driven by said shaft for reciprocating said scraper axially with respect to said stock through a stroke longer in each direction than the said increment of length of said stock fed into the machine by each operation of said feed means.

7. In a machine for producing forged metallic articles from hot elongated rod stock, including a main drive shaft, feed means intermittently driven by said shaft for advancing a predetermined increment of length of the hot rod stock axially into the machine once during each cycle of operation of the machine, shear means driven by said shaft for shearing off during each cycle of operation of the machine the increment of length of the rod stock advanced into the machine by said feed means, a die supported in said machine, means for delivering each sheared-off length of hot stock into said die and a header slide driven by said shaft having punch means for forging a sheared-off blank in said die once during each cycle of operation of the machine, a descaling means for the hot rod stock comprising a scraper engaging such stock and means driven by said shaft for reciprocating said scraper axially with respect to said stock both during and between the intervals during which such stock is being advanced into said machine by said feed means and through a stroke longer in each direction than the increment of length of the stock, advanced into the machine by each operation of said feed means.

References Cited in the file of this patent

UNITED STATES PATENTS

| | | |
|---|---|---|
| 252,440 | Duckworth | Jan. 17, 1882 |
| 311,969 | Fischer | Feb. 10, 1885 |
| 1,024,046 | Weeks | Apr. 23, 1912 |
| 1,198,894 | Cote | Sept. 19, 1916 |
| 1,333,036 | Robertson | Mar. 9, 1920 |
| 1,638,107 | Dwyer | July 26, 1927 |
| 1,755,325 | Kinney | Apr. 22, 1930 |
| 2,225,424 | Schwarzkopf | Dec. 17, 1940 |
| 2,372,516 | Rechton et al. | Mar. 27, 1945 |
| 2,538,707 | Reynolds | Jan. 16, 1951 |
| 2,657,403 | Eade | Nov. 3, 1953 |
| 2,698,950 | Van Haandel | Jan. 11, 1955 |
| 2,755,545 | Moore | July 24, 1956 |
| 2,781,531 | Byam | Feb. 19, 1957 |